UNITED STATES PATENT OFFICE.

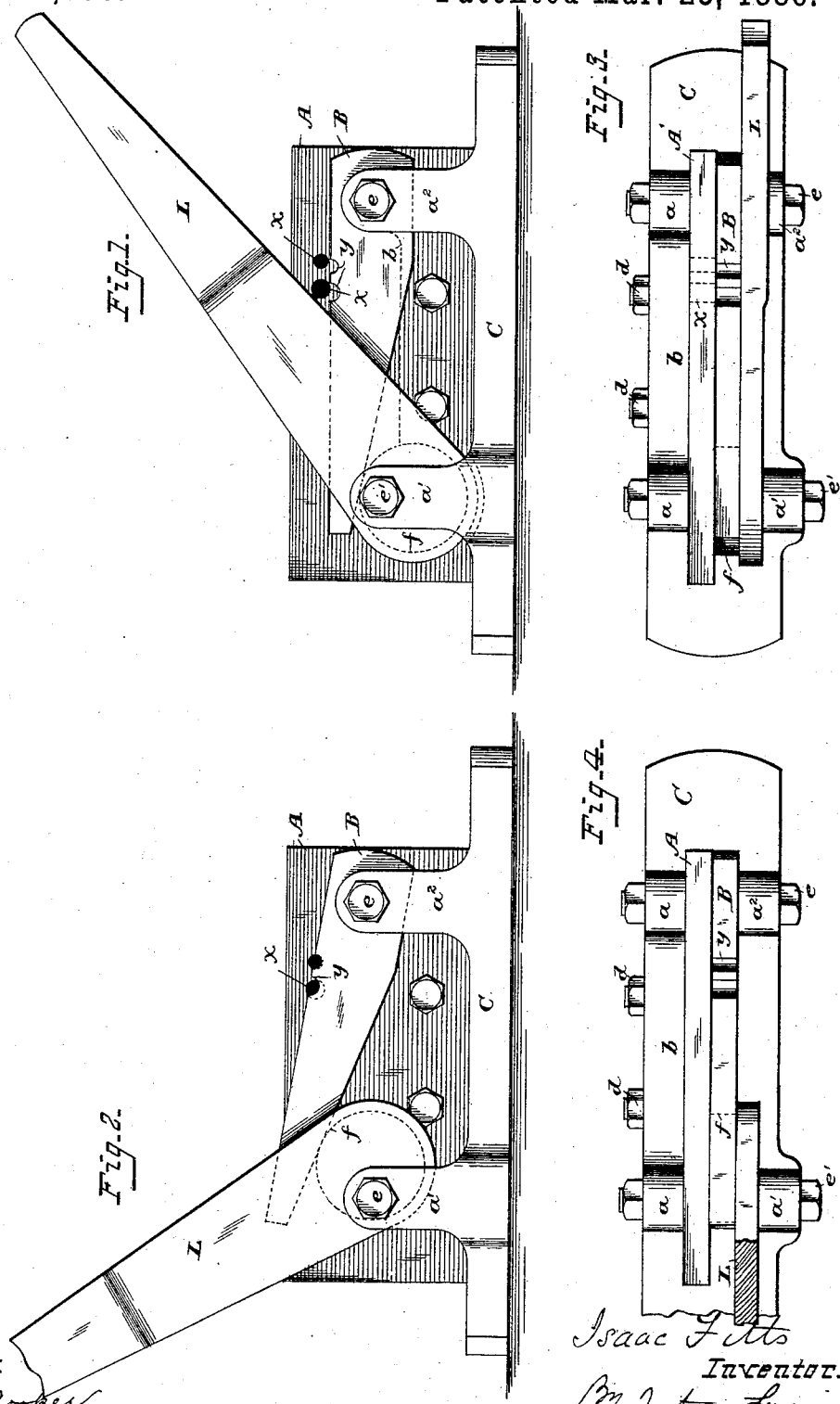

ISAAC FITTS, OF NASHUA, NEW HAMPSHIRE.

ROD-CUTTER.

SPECIFICATION forming part of Letters Patent No. 338,396, dated March 23, 1886.

Application filed November 5, 1885. Serial No. 181,941. (No model.)

*To all whom it may concern:*

Be it known that I, ISAAC FITTS, a citizen of the United States, and a resident of Nashua, in the county of Hillsborough and State of New Hampshire, have invented certain new and useful Improvements in Rod-Cutters, of which the following is a specification.

My invention is a cutting device for severing metallic rods or bars, the said devices consisting in a stationary perforated plate and a cutter bar or plate vibrating in contact with the surface of the plate, and a device for actuating the cutter-bar, all as fully set forth hereinafter, and as represented in the accompanying drawings, in which—

Figure 1 is a side elevation of my improved rod-cutter; Fig. 2, the same, showing the parts in a different position; Fig. 3, a plan of Fig. 1; Fig. 4, a plan of Fig. 2.

The cutters consist of a stationary plate, A, and a pivoted plate or bar, B, which vibrates with its inner face in contact with the face of the plate A, and through the plate A at right angles to the surfaces thereof extends an opening or openings, $x$, so arranged as to be crossed by the plate B as the latter is vibrated. The rod or wire to be cut is passed through the opening $x$, and the bar B is then carried across the opening, when the bar will be sheared with a clean transverse cut by the action of the continuous shearing-edges of the two plates, the cut being made at right angles to the bar without producing any fin or wounding either portion of the rod. To secure this result the wire or rod should fit nicely the opening $x$, for which reason when wires or rods of different sizes are to be cut, I provide the plate with two or more openings corresponding to the sizes of said wires; and I have found that a very much better shearing effect is produced by forming in the edge of the cutter-bar B notches $y$, curved to correspond to the curvature of the corresponding openings, $x$, so that as the cutter-bar is carried toward the rod the latter will be received into the opening or recess $y$, and the cut will begin in a curved line, extending half-way round the rod, and will terminate at a single point as the curved edge of the notch $y$ passes from the curved edge of the opening $x$.

The cutter-plates may be supported by any suitable base or bed piece. As shown, there is a base-plate, C, upon which are four standards, $a\ a\ a'\ a^2$, and the plate A is bolted against the side of a flange, $b$, extending between the standards $a\ a$ by bolts $d\ d$. The cutter-bar B is arranged to swing upon a bolt, $e$, extending through the standards $a\ a^2$, there being just sufficient space between these standards for the plate A and the cutter B, so that the latter must move in close contact with the face of the plate A.

Any suitable mechanical appliance may be used for swinging the cutter-bar B upon its pivot—as, for instance, a toggle or wedge. I prefer, however, to use a cam or eccentric hung to a bolt, $e'$, extending through the standards $a\ a'$ and connected to a lever, L. The cutter-bar B extends over the eccentric $f$, and is raised or lowered as the lever L is turned from one position to another.

In Fig. 1 the parts are shown in position for the reception of the rod to be cut. In Fig. 2 the parts are shown in the position which they occupy as the cut approaches completion.

Without limiting myself to the precise construction and arrangement of parts shown, I claim—

1. The combination of a perforated stationary plate and a cutter-bar pivoted to swing across the perforations in the stationary plate in contact with the face thereof, and having a semicircular sharp-edged groove at the edge, substantially as and for the purpose set forth.

2. The combination of the perforated plate secured to supports upon the base C, a cutter-bar in contact with the face of said plate pivoted to a standard upon the base, a lever pivoted to another standard upon the base and provided with an eccentric arranged to actuate the cutter-bar, substantially as described.

In testimony whereof I have signed my name to this specification in the presence of two subscribing witnesses.

ISAAC FITTS.

Witnesses:
GEORGE M. THOMPSON,
OSWALD LAPIERRE.